United States Patent [19]

Usui et al.

[11] Patent Number: 4,509,064
[45] Date of Patent: Apr. 2, 1985

[54] HEAT-SENSITIVE RECORDING PAPER AND FILLER THEREFOR

[75] Inventors: Koichi Usui; Masahide Ogawa, both of Shibata; Kunio Goto, Nakajo; Teiji Sato; Masanori Tanaka, both of Shibata; Seikichi Takahashi, Nakajo; Kinichi Ono, Kurokawa; Seiji Kojima, Nakajo, all of Japan

[73] Assignee: Mizusawa Industrial Chemicals, Ltd., Osaka, Japan

[21] Appl. No.: 574,574

[22] Filed: Jan. 27, 1984

[30] Foreign Application Priority Data

Sep. 13, 1983 [JP] Japan .................................. 58-167474

[51] Int. Cl.$^3$ .............................................. B41M 5/18
[52] U.S. Cl. .................................. 346/207; 106/288 B; 346/225; 428/331
[58] Field of Search .................... 106/288 B; 346/200, 346/207, 208, 225; 428/331

[56] References Cited

FOREIGN PATENT DOCUMENTS 2800485  7/1978  Fed. Rep. of Germany ...... 346/209
0134650 10/1979  Japan .................................. 346/207

Primary Examiner—Bruce H. Hess
Attorney, Agent, or Firm—Sherman & Shalloway

[57] ABSTRACT

Disclosed is a filler for a heat-sensitive recording paper comprising finely divided amorphous silica having a BET specific surface area of 10 to 100 m$^2$/g and a bulk density of 0.14 to 0.30 g/cc, said finely divided amorphous silica having such a secondary particle size distribution that secondary particles having a size smaller than 4 microns, as measured by the centrifugal precipitation method, occupy at least 90% by weight of the total particles.

This filler is excellent in the effects of preventing the background coloration, improving the lubricating property, preventing the adhesion of scum and improving the image density.

2 Claims, 3 Drawing Figures

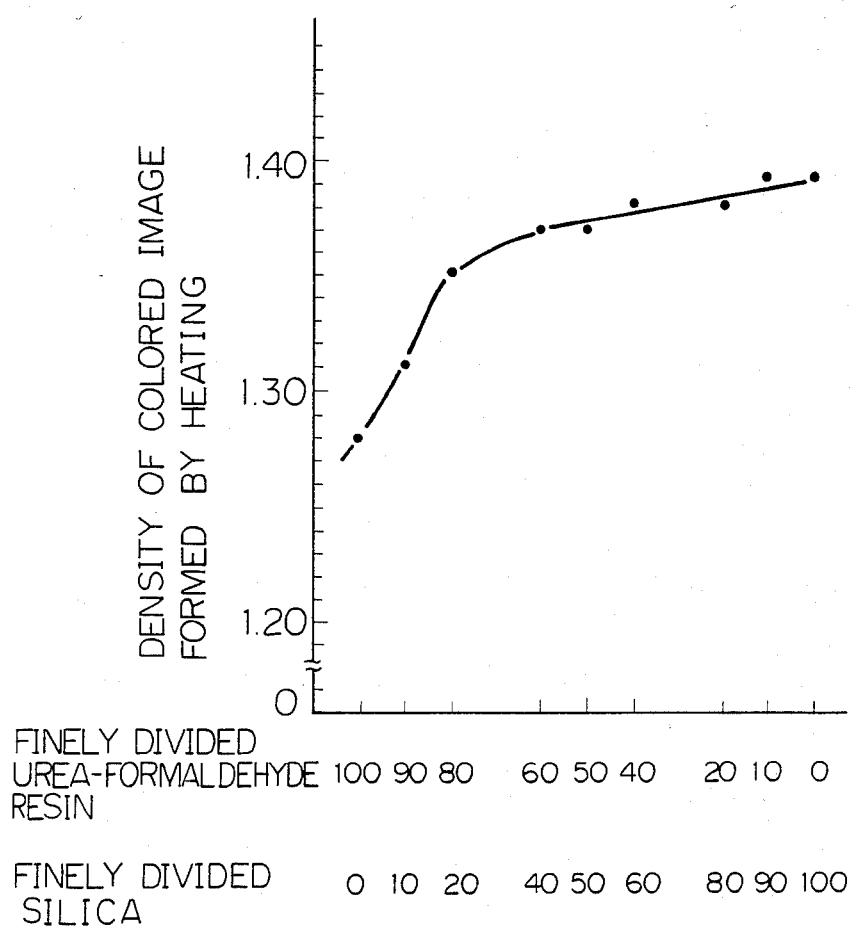

HEAT-SENSITIVE RECORDING PAPER AND FILLER THEREFOR

BACKGROUND OF THE INVENTION (1) Field of the Invention:

The present invention relates to a filler for a heat-sensitive recording paper. More particularly, the present invention relates to a filler for a heat-sensitive recording paper which comprises finely divided amorphous silica having novel characteristics. Furthermore, the present invention relates to a heat-sensitive recording paper comprising this filler.

(2) Description of the Prior Art:

A heat-sensitive recording paper comprising a support such as paper and a recording layer formed thereon, which comprises a dispersion of a coloring agent such as a leuco dye and a color developer capable of forming a color on contact with the coloring agent in the hot state, such as a phenol, in a binder has been widely used for facsimile, printers, data communication, computer terminals, measuring devices, passometers, copying machines and the like while using a thermal head, a hot pen, an infrared ray lamp, a laser or the like as a heat source.

A heat-sensitive recording paper of this type is defective in that when recording is carried out by bringing a recording layer into contact with a recording head or the like, the components contained in the recording layer are fused and adhere to the recording head or the like to cause such troubles as scum adhesion and sticking.

Various fillers have been incorporated into recording layers so as to eliminate this disadvantage. Namely, it has been known from old that calcium carbonate, kaolin, talc, alumina and titanium dioxide are incorporated. Recently, incorporation of a hydrous aluminum silicate mineral (Japanese Patent Application Laid-Open Specification No. 72992/81), amorphous synthetic aluminum silicate (Japanese Patent Publication No. 19035/82), wollastonite or calcium silicate (Japanese Patent Application Laid-Open Specification No. 41995/82), an alkaline earth metal salt (Japanese Patent Application Laid-Open Specification No. 80095/82) and aluminum hydroxide (Japanese Patent Application Laid-Open Specification No. 14093/82) has been proposed.

It seems curious that amorphous silica as a filler is not included in these proposals. It is considered that the reason is that amorphous silica generally has a surface activity and provides an active surface for the reaction between a leuco dye and a phenol and this reaction is hence promoted to cause so-called background coloration.

Amorphous silica by the wet method and amorphous silica by the gas phase method (dry method) are known as finely divided amorphous silica, and they are applied to various uses according to the characteristics thereof. Silica by the web method is prepared by neutralizing an aqueous solution of an alkali metal silicate such as so-called water glass with a mineral acid or the like. According to this method, a sol of silicic acid is once formed and sol particles are agglomerated to form a gel-like precipitate. Therefore, finely divided amorphous silica has a primary particle size of 10 to 20 millimicrons, but these fine particles tend to agglomerate to form secondary particles having a relatively large particle size. This silica by the wet method is relatively porous and has a large surface activity, and the specific surface area is larger than 200 m$^2$/g and is as high as 800 m$^2$/g in some cases.

Silica by the gas phase method is prepared by hydrolyzing silicon tetrachloride in an oxyhydrogen flame. The primary particle size of this silica is in the range of from 10 to 20 millimicrons and the surface activity is considerably small, but generally, the specific surface area is larger than 100 m$^2$/g.

When silica such as mentioned above is used as a filler for a heat-sensitive recording paper, there are many problems to be solved. The first problem is a problem of the background coloration (background contamination or background fogging) of the recording layer. In the case of silica having a relatively large activity, such as silica by the web method, the recording layer is colored in an inherent hue before recording and a clear image cannot be obtained. After recording, the background is colored during storage and the storability or life of a print is degraded.

The second problem resides in that most of amorphous silicas have an abrasive property and therefore, the relative movement between the recording paper and the recording head or pen, that is, scanning, is inhibited and the recording head or the recording layer per se is readily worn away.

The third problem resides in that in order to prevent the adhesion of scum, the oil absorption, that is, the bulk, of amorphous silica should be considerably large and in order to prevent the background coloration, the surface activity should be controlled to a level as low as possible, and it is difficult to simultaneously satisfy these two contradictory requirements.

SUMMARY OF THE INVENTION

It is therefore a primary object of the present invention to provide an amorphous silica type filler for a heat-sensitive recording paper in which the background coloration is controlled and which is excellent in the lubricating property and scum adhesion-preventing property and also provide a heat-sensitive recording paper comprising this filler.

Another object of the present invention is to provide an amorphous silica type filler for a heat-sensitive recording paper which is excellent in the whiteness of the background while the background coloration is prominently controlled and which can form a high-density image at the thermal recording step.

In accordance with the present invention, there is provided a filler for a heat-sensitive recording paper comprising finely divided amorphous silica having a BET specific surface area of 10 to 100 m$^2$/g and a bulk density of 0.14 to 0.30 g/cc, said finely divided amorphous silica having such a secondary particle size distribution that secondary particles having a size smaller than 4 microns, as measured by the centrifugal precipitation method, occupy at least 90% by weight of the total particles.

BRIEF DESCRIPTION OF THE DRAWINGS

FIG. 3 is a graph showing the relation between the mixing ratio in an amino resin-silica mixture and the density of the recorded image.

DETAILED DESCRIPTION OF THE PREFERRED EMBODIMENTS

Figure 1:
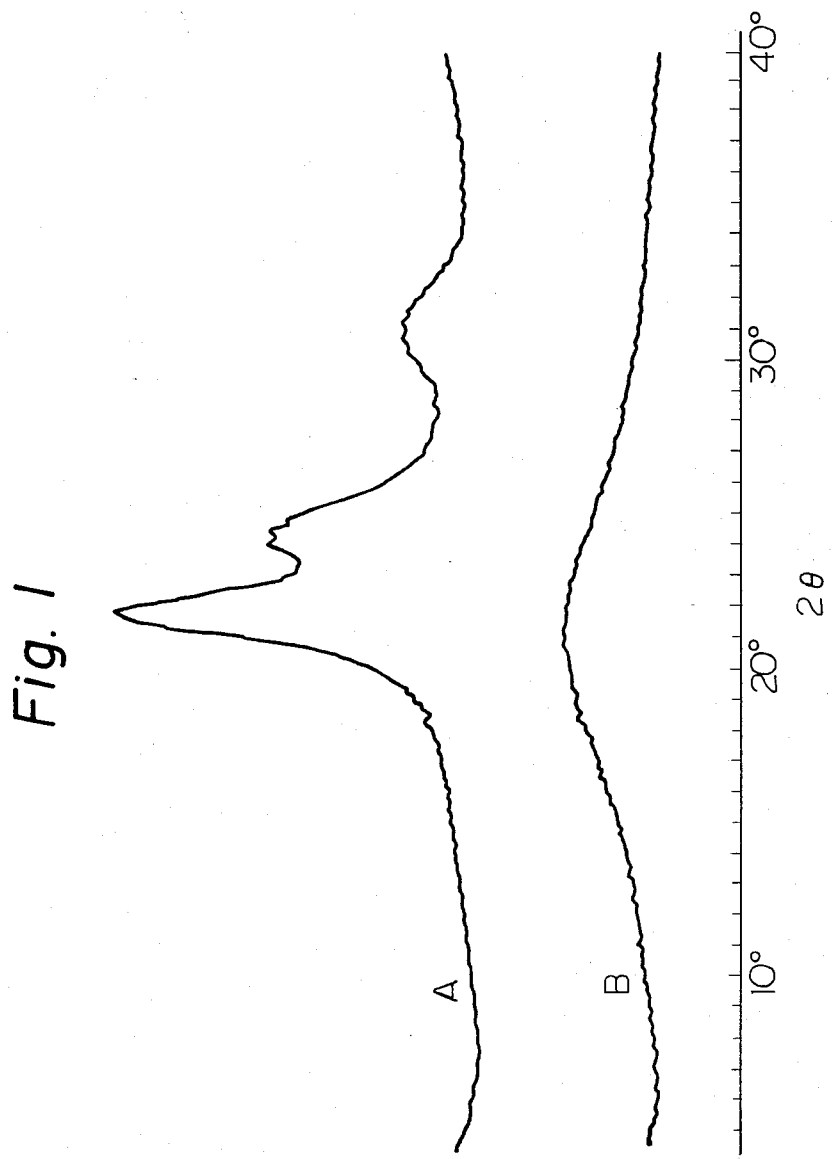
FIG. 1 shows X-ray diffraction patterns of an amino resin used in the present invention and a known amino resin.

As is apparent from the detailed Description given hereinafter, the present invention is based on the novel finding that if an alkali metal silicate is reacted with an acid in a concentrated metal salt solution under specific conditions, finely divided amorphous silica having the above-mentioned characteristics in combination is obtained and if this silica is used as a filler for a heat-sensitive recording paper, the background coloration is prevented, the lubricating property is improved, the adhesion of scum is prevented and the image density is increased.

Amorphous silica used in the present invention is characterized in that the BET specific surface area is relatively small, that is, 10 to 100 m$^2$/g, preferably 30 to 70 m$^2$/g, especially preferably 40 to 60 m$^2$/g. As pointed out hereinafter, amorphous silica is essentially surface-active and generally has a tendency to promote the reaction between a leuco dye and a phenol. According to the present invention, by controlling the specific surface area of the amorphous silica to the above-mentioned low level and greatly reducing the surface activity, the reaction between a phenol and a leuco dye can be controlled to a low level at the step of preparing a composition for a heat-sensitive recording layer and the step of coating and drying this composition or during the storage of a recording paper before and after recording, and therefore, the background coloration is prominently controlled.

Among amorphous silicas by the wet method, one having such a small specific surface area is very peculiar and this amorphous silica can be prepared by directly precipitating fine particles of a silica gel without forming silica sol particles when an aqueous solution of an alkali metal silicate is neutralized with an acid.

Since amorphous silica used in the present invention has a small specific surface area as mentioned above and is prepared through the peculiar preparation process, it has a relatively large number average of primary particle size, that is, at least 30 millimicrons, especially 40 to 90 millimicrons, as measured by an electron microscope. It is known that the following relationship is generally established between the BET specific surface area (m$^2$/g) and the primary particle size (millimicrons):

$$SA = 2700/D$$

wherein SA stands for the BET specific surface area and D stands for the primary particle size. Thus, it will readily be understood that the primary particle size of amorphous silica used in the present invention is considerably larger than that of the known amorphous silica.

Another prominent characteristic feature of the amorphous silica used in the present invention is that the bulk density is 0.14 to 0.30 g/cc, especially 0.16 to 0.26 g/cc, as measured according to the method of JIS K-6220. The bulk density has relations to both the prevention of the adhesion of scum to the recording head or the like and the wearing or the wearability of the recording layer. If the bulk density is too large and exceeds the above-mentioned range, the oil absorption of amorphous silica is reduced and therefore, the effect of preventing the adhesion of scum is reduced and the recording head or the like falling in contact with the recording layer is readily worn away. On the other hand, when the bulk density is too small and below the above-mentioned range, the wearing of the recording layer per se is increased, and dusting or peeling is readily caused. In contrast, according to the present invention, by controlling the bulk density within the above-mentioned range, wearing of the recording layer, the recording head or the like can be minimized while preventing the adhesion of scum to the recording head or the like. The bulk density of amorphous silica used in the present invention is much larger than the bulk density of silica by the dry method which is in the range of from 0.04 to 0.06 g/cc, and corresponds to that of silica by the wet method which has a relatively large bulk density.

Since the amorphous silica of the present invention has the above-mentioned bulk density, the oil absorption of this silica is in the range of from 100 to 200 cc/100 g, especially from 120 to 180 cc/100 g, as measured by the method of JIS K-5101.

The amorphous silica used in the present invention has such a secondary particle size distribution that the secondary particles having a size smaller than 4 μm occupy at least 90% by weight of the total particles, and it is especially preferred that the median diameter of the secondary particles be in the range of from 0.2 to 1 μm. As pointed out hereinbefore, the primary particle size of this amorphous silica is considerably large, but the degree of agglomeration is low and the secondary particles are very fine and relatively uniform in the size.

The secondary particle size of the amorphous silica has influences on the density of an image formed by thermal recording, and as shown in the examples given hereinafter, the finer is the secondary particle size, the higher is the density of an image formed by recording. It is said that if a coloring dye formed at the thermal recording is present around the filler particles in the form covering the filler particles, the density is improved by the pigment effect. Since the amorphous silica used in the present invention is fine and uniform in the dispersion particle size in the recording layer, that is, the secondary particle size, it is considered that the coloring dye is likely to be present in the form covering the filler and the image density is improved.

From the X-ray diffractometric viewpoint, amorphous silica used in the present invention should naturally be amorphous, and it has an ignition loss of 3 to 7% by weight (1000° C.×2 hours) as an inherent property of silica by the wet method. Furthermore, since this amorphous silica is prepared in a concentrated solution of a metal salt, amorphous silica contains a minute amount of this salt as an impurity.

Since the finely divided amorphous silica used in the present invention has the above-mentioned particle structure and characteristics, if it is used as a filler for a heat-sensitive recording paper, several additional advantages are attained. When this silica is rubbed between fingers, it gives a smooth touch like that of talc, and when it is brought into sliding contact with a surface, it is well extended and spread along the sliding contact surface. In fact, the coated surface containing this finely divided silica has an excellent slip property and the blocking tendency is drastically reduced, and therefore, feeding of respective recording sheets from the assembly of piled sheets can be performed very smoothly and the running property of the recording head or pen is prominently improved. Furthermore, when this finely divided silica is coated on a paper substrate or the like, it is uniformly extended and spread on the entire coated surface. Because of this characteristic, the surface coated with the finely divided silica of the present invention is excellent in the smoothness over the surface coated with other silica type filler. Moreover, this finely divided silica has a higher hiding power than the known finely divided silica. Accordingly, this silica exerts an effect of hiding the texture or color of the coated surface and whitening the coated surface.

The finely divided amorphous silica used in the present invention is prepared by reacting an alkali metal silicate with an acid in a concentrated solution of a metal salt under such conditions that fine gel particles of silica are directly precipitated without formation of sol-like silica, though the applicable preparation process is not limited to this process.

This preparation process is in common with the conventional process for preparing silica by the wet method in the point where a solution of an alkali metal silicate is neutralized with an acid, but this process is characterized in that this neutralization is carried out in a concentrated metal salt solution especially by the simultaneous pouring method and a gel of fine particles of silica is directly formed by this neutralization without formation of sol particles of silica.

According to the conventional process for preparing silica by the wet method, an acid is added to an aqueous solution of an alkali metal silicate to form amorphous silica. When this reaction is observed, it is seen that at the initial stage of the addition, the reaction mixture is transparent or pearly but the reaction mixture becomes viscous and at the middle stage of the addition, precipitation of silica begins. This fact indicates that according to the web method, sol particles of silica are once formed by neutralization and the sol particles are agglomerated to form amorphous silica particles. Furthermore, silica particles formed by neutralization are alkaline at the initial stage and they gradually become acidic with advance of neutralization, and properties of the amorphous silica precipitate formed at the initial stage are considerably different from those of the amorphous silica precipitate formed at the middle stage of the reaction.

In contrast, in the preparation process of the present invention, since the neutralization of the aqueous solution of the alkali metal silicate with the acid is carried out in a concentrated metal salt solution, by strong coagulating and precipitating actions of the salt, a gel of fine particles of silica is directly formed without passing through sol particles of silica. By dint of this characteristic of the preparation process, the finely divided silica used in the present invention is composed of primary particles having a size of at least 30 millimicrons, especially 40 to 90 millimicrons, though conventional silica by the web method in an agglomerate of sol particles having a particle size of 10 to 20 millimicrons. Furthermore, since gel particles are formed under the above-mentioned coagulating and precipitating actions of the salt, this finely divided amorphous silica used in the present invention has a specific surface area of 10 to 70 m$^2$/g, which is much smaller than the specific surface area of conventional amorphous silica.

Moreover, according to this preparation process, since the simultaneous pouring method is adopted, neutralization is carried out at a constant pH value of 5 to 9 throughout the reaction from the initial stage to the final stage, and the properties, especially the particle size, of formed amorphous silica are uniform. This is another advantage attained by the above preparation process.

It is important that the concentrated aqueous solution of the metal salt should have a high concentration from the initial stage of additional of the alkali metal silicate or acid. Although an alkali metal salt should naturally be formed by the reaction between the alkali metal silicate and acid, if the alkali metal salt is not contained at a high concentration in the reaction system at the start of the reaction, formed amorphous silica has a fine primary particle size but a coarse secondary particle size, and the specific surface area tends to increase.

The concentration of the metal salt is at least 5%, especially 10 to 20%, at the start of the neutralization reaction, though the preferred concentration differs according to the kind of the metal salt. If the salt concentration is lower than 5%, the secondary particle size or specific surface area tends to increase beyond the range specified in the present invention, and even if the concentration is too high, no particular advantage is brought about but the process becomes economically disadvantageous.

Alkali metal and alkaline earth metal salts of inorganic acids and organic acids can be used as the metal salt. For example, there can be mentioned sodium chloride, sodium nitrate, sodium sulfate, sodium sulfite, sodium carbonate, sodium phosphate, potassium chloride, sodium acetate, sodium methane-sulfonate, calcium chloride, magnesium chloride and magnesium sulfate. These metal salts may be used singly or in the form of a mixture of two or more of them. In the case of a salt of a monobasic acid, the allowable range of the salt concentration for obtaining silica having the above-mentioned properties is wide, but in the case of a salt of a dibasic acid, this allowable range of the salt concentration is relatively narrow. As the salt advantageous from the economical viewpoint and suitable for attaining the objects of the present invention, there can be mentioned sodium chloride, Glauber salt and a mixture thereof.

An aqueous solution of an optional alkali metal silicate, for example, an alkali metal silicate represented by the following formula:

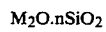

wherein M stands for an alkali metal and n is a number of from 1 to 3.8, can be used as the alkali metal silicate. From the economical viewpoint, it is preferred that so-called sodium silicate No. 3 in which n is in the range of from 3.0 to 3.4 be used. The concentration of the alkali metal silicate used for the reaction is not particularly critical, but from the viewpoint of the adaptability to the operation, it is preferred that the concentration of the alkali metal silicate be 10 to 25% as SiO$_2$.

Various inorganic acids and organic acids may be used as the acid. From the economical viewpoint, it is preferred that a mineral acid such as sulfuric acid, hydrochloric acid, nitric acid or phosphoric acid be used. In order to carry out the reaction uniformly, it is preferred that the acid be used in the form of a dilute aqueous solution having a concentration of 5 to 20%.

The neutralization reaction may be carried out at room temperature or under heating, but it is ordinarily preferred that the reaction be promptly advanced at an elevated temperature of 50° to 100° C. When the alkali metal silicate and acid are simultaneously poured into the concentrated aqueous solution of the metal salt to effect the neutralization reaction, it is important that the three components should be mixed promptly and homogeneously. Accordingly, simultaneous pouring is carried out under high speed agitation or shearing agitation. This reaction may be carried out batchwise or in a continuous manner. In the former case, for example, the concentrated salt solution is charged into a reaction vessel and both the starting materials are simultaneously poured into the reaction vessel, or the concentrated salt solution is circulated between a reaction vessel and a preliminary mixing tank and both the starting materials are simultaneously poured into the preliminary mixing tank. In the latter case, the reaction is carried out in a continuous manner by using a multi-stage reaction vessel or column type reaction vessel.

In preparing amorphous silica, it is preferred that the neutralization reaction be carried out so that the SiO$_2$ concentration in the slurry at the time of termination of the reaction is 1 to 10%. If this concentration is lower than 1%, the process becomes disadvantages in the operation or apparatus and if the concentration is higher than 10%, the secondary particles tend to become coarse. Precipitation of finely divided amorphous silica is completed in a very short time by the above-mentioned simultaneous pouring and mixing, but in some cases, it is preferred that aging be conducted for about 30 minutes to about 10 hours after the precipitation.

The slurry formed by the reaction is subjected to solid-liquid separation such as filtration to separate amorphous silica from the mother liquor, and if necessary, the separated silica is washed with water and dried to obtain a product. If necessary, the separated mother liquor is subjected to the separation of different salts or the concentration adjustment by condensation or dilution, and it is recycled to the reaction system and used again for the reaction.

In accordance with one preferred embodiment of the present invention, an amorphous silica filler having a BET specific surface area of 10 to 100 m$^2$/g and a bulk density of 0.14 to 0.30 g/cc, which has such a secondary particle size distribution that secondary particles having a size smaller than 4 microns, as measured by the centrifugal precipitation method, occupy at least 70% by weight of the total particles, and an organic filler composed of fine particles of an amino resin obtained by condensing substantially equimolar amounts of a functional amino group-containing component and a formaldehyde component in the presence of a catalyst, which has an oil absorption of 20 to 90 ml/100 g and a specific surface area smaller than 20 m$^2$/g, are mixed at a weight ratio of from 90/10 to 10/90, and the mixture is used as a filler for a heat-sensitive recording paper.

The amino resin filler used in the present invention is obtained by condensing a component containing a functional amino group (—NH$_2$) with formaldehyde at a substantially equimolar ratio in the presence of a catalyst.

As the functional amino group-containing component, there can be mentioned urea, thiourea, guanidine, dicyandiamide, melamine, acetoguanamine and benzoguanamine. Among these compounds, urea is most preferred.

Formalin can be used as formaldehyde, but a starting compound capable of forming formaldehyde in the reaction system, such as paraformaldehyde, may be used.

By the term "condensation at a substantially equimolar ratio" used in the instant specification, it is meant that the amino group-containing component and the formaldehyde component are included in the resin at a substantially equimolar ratio. More specifically, when urea is used, the formed resin is composed of poly(methylene-urea), and terminal methylol groups are not substantially present, and if present, the amount of the terminal methylol groups is very small.

As is seen from the foregoing description, the amino resin used in the present invention has a regular and linear recurring structure, and hence, it is crystallized. An amino resin preferably used has an X-ray diffraction pattern which is substantially the same as the X-ray diffraction pattern shown below.

| d (spacing, Å) | I/Io (relative intensity) |
|---|---|
| 4.05 | 100 |
| 3.70 | 40–70 |
| 2.90 | 5–20 |

By the term "substantially the same" used herein, it is meant that the spacing is not absolute but a peak having the above-mentioned relative intensity appears in the vicinity of the shown spacing and the spacing can be shifted within ±0.15.

Curve A shown in FIG. 1 of the accompanying drawings shows an X-ray diffraction pattern of a urea resin used in Example 7 of the present invention, and curve B shows an X-ray diffraction pattern of Pergopak M (urea resin) used in Japanese Patent Publication No. 20918/82. From these curves, it is seen that the crystal structure of the urea resin used in the present invention is different from the conventional urea resin.

Ordinarily, the reaction between the two components is carried out in an aqueous system, and it is most preferred that both the starting components be reacted at an equimolar ratio. However, if waste of one component is permissible, this component may be used in a certain excess. For example, if a loss of formaldehyde is taken into account, the amino component and formaldehyde component may be used for the reaction at a molar ratio of from 1/1 to ½.

An acid catalyst is preferably used as the catalyst, but a combination of an alkali catalyst and an acid catalyst may also be used.

As the acid catalyst, there can be used, for example, hydrochloric acid, nitric acid, sulfuric acid, phosphoric acid, oxalic acid and toluene-sulfonic acid. The catalyst is made present in the reaction system in an amount of 0.001 to 0.1% by weight. The condensation reaction conditions are not particularly critical, but it is preferred that the reaction be carried out at a temperature of 60° to 100° C. for about 20 to about 200 minutes. In order to increase the yield of amino resin particles having the properties specified in the present invention, it is preferred that the reaction be carried out while controlling the total concentration of the functional amino group-containing component and formaldehyde component in the reaction system to a level of at least 5% by weight, especially 10 to 30% by weight. By this reaction, the intended amino resin is obtained in the form of a precipitate of white fine powder. The precipitate is recovered by filtration, and if necessary, the precipitate is washed with water, pulverized and dried, and the particle size adjustment is then performed according to need.

There can also be adopted a process in which the reaction of the first stage is carried out by using an alkali catalyst such as caustic soda, ammonia or calcium hydroxide and after completion of the reaction of the first stage, an acid catalyst is added and the intended product is recovered in the form of fine particles.

The amino resin formed by the above reaction has a structure in which the skeletones of the functional amino group-containing component such as urea are alternately connected to one another at the positions of the amino groups through methylene groups, and this amino resin is characterized in that methylol groups are not substantially present at the terminal ends of the molecule chain and it has a crystal structure which is clear and definite from the X-ray diffractometric viewpoint. Because of this structural characteristic, the amino resin insoluble in many solvents and has relatively small surface activity and oil absorption.

The amino resin formed by the above reaction has a relatively small oil absorption, that is 20 to 90 ml/100 g, especially 30 to 70 ml/100 g, as determined according to the method of JIS K-5101. Ordinarily, the oil absorption has an especially close relation to the bulk of powder among various powder characteristics, and bulky powder has a large oil absorption. The bulk density of the amino resin used in the present invention is large and ordinarily in the range of 0.2 to 0.6 ml/g, as determined according to the method of JIS K-6220.

Although the amino resin particles used in the present invention have a very small oil absorption, they exert an unexpected function of highly preventing the adhesion of scum. By the term "adhesion of scum" is meant a phenomenon that a melt of a wax or the like produced when a heat-sensitive recording paper is used for the thermal recording adheres to a thermal head or the like. It has been considered that in order to present occurrence of this undesirable phenomenon, a filler having a large oil absorption or bulk should be used to absorb or adsorb the above-mentioned melt and thus prevent the adhesion of scum.

The amino resin particles used in the present invention have an oil absorption equivalent to that of calcium carbonate having no substantial effect of preventing the adhesion of scum, but as is illustrated in the examples given hereinafter, the amino resin particles show a prominent effect of preventing the adhesion of scum. Though the reason is not completely elucidated, it is believed that at the step of the thermal recording, the amino resin particles are maintained in the non-fused shape-retaining state but the resin molecules in the particles are in the rubbery state, and therefore, the miscibility or compatibility with the melt of a wax or the like is increased. If the oil absorption is too large and exceeds the range sepcified in the present invention, the amino resin particles lose the characteristics of the adsorptive particles at the step of the thermal recording and the practical effect of preventing the adhesion of scum is considerably reduced.

Since the amino resin particles used in the present invention are very dense, the specific surface area is small. Ordinarily, the specific surface area is smaller than 20 m$^2$/g, preferably 2 to 10 m$^2$/g. The particle size of the amino resin particles is in the range of 0.1 to 10 microns, preferably 1 to 5 microns, as the median diameter.

It is preferred that the melting or softening point of the amino resin be higher than 150° C., especially higher than 200° C.

Figure 2:
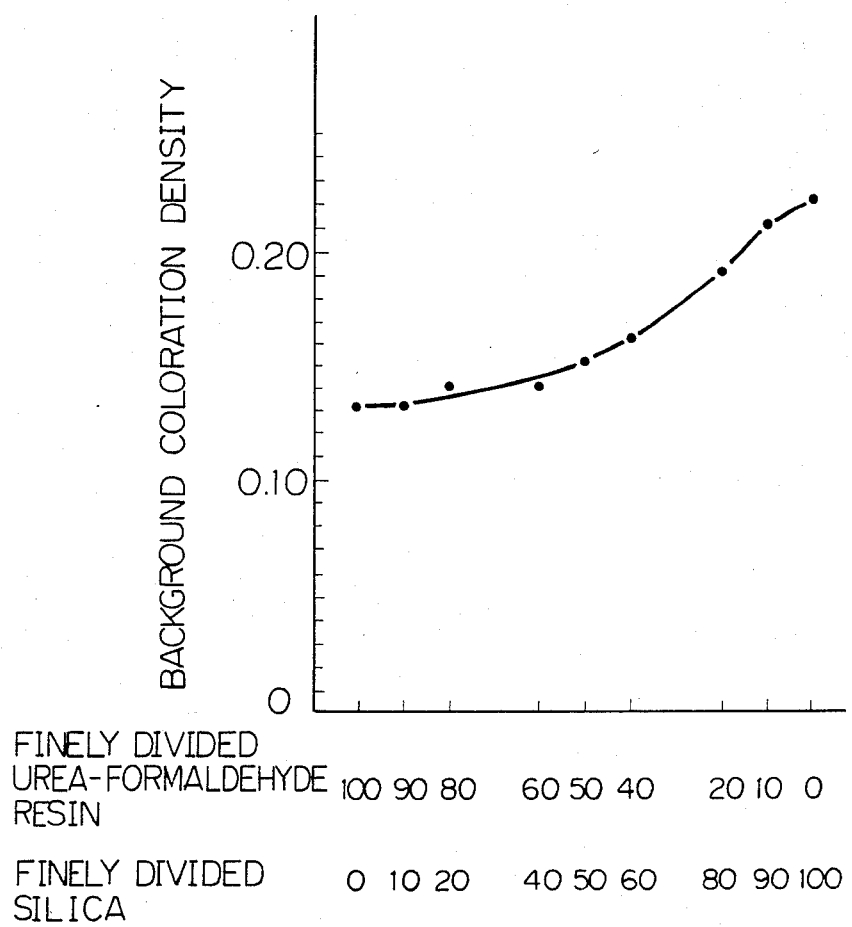
FIG. 2 is a graph showing the relation between the mixing ratio in an amino resin-silica mixture and the background coloration density.

Advantages attained by using amorphous silica in combination with the above-mentioned amino resin in the present invention will become apparent from FIGS. 2 and 3. Namely, as shown in FIG. 2, the background coloration density is reduced below the arithmetic mean value, and from FIG. 3, it is seen that the image density is increased above the arithmetic mean value.

In accordance with another embodiment of the present invention, there is provided a heat-sensitive recording paper comprising a paper substrate and a heat-sensitive recording layer formed on the paper substate, which comprises a composition formed by dispersing in a binder a coloring agent composed of a leuco dye, a color developer composed of a heat-fusible phenol and an inorganic filler, wherein the inorganic filler comprises finely divided amorphous silica having a BET specific surface area of 10 to 100 m$^2$/g and a bulk density of 0.14 to 0.30 g/cc, said finely divided amorphous silica having such a secondary particle size distribution that secondary particles having a size smaller than 4 microns, as measured by the centrifugal precipitation method, occupy at least 90% by weight of the total particles.

The amorphous silica filler of the present invention may be incorporated into the above-mentioned known heat-sensitive recording layer-forming composition in an amount of 10 to 60% by weight, especially 20 to 40% by weight, based on the solids.

As the leuco dye incorporated as the coloring agent in the above composition, there can be used all of leuco dyes used for heat-sensitive recording papers of this type, such as triphenylmethane type leuco dyes, fluorane type leuco dyes, spiropyran type leuco dyes, Rhodamine lactam type leuco dyes, Auramine type leuco dyes and phenothiazine type leuco dyes. These leuco dyes may be used singly or in the form of mixtures of two or more of them.

As the phenol used as the color developer, there can be used all of phenols that are solid at normal temperatures and are heat-fusible, such as bisphenol A, bisphenol F, 2,6-dihydroxybenzoic acid and benzyl-p-hydroxylenebenzoate.

An optional water-soluble binder can be used as the binder. For example, there can be mentioned starch, cyanomethylated starch, carboxymethylated starch, ethyl cellulose, carboxymethyl cellulose, hydroxyethyl cellulose, polyvinyl alcohol, a water-soluble acrylic resin, a vinyl methyl ether copolymer and sodium alginate.

A sensitizer may be incorporated into the above composition according to need. For example, various waxes such as fatty acids, fatty acid amides, carnauba wax and polyethylene wax may be used as the sensitizer. Furthermore, and organic base such as an alkanol amine may be incorporated so as to prevent the background coloration.

For formation of the heat-sensitive recording layer, a dispersion of a leuco dye in a binder solution and a dispersion of a phenol in a binder solution are prepared, and both the dispersions are coated on a substrate such as paper or artificial paper. The amorphous silica filler of the present invention may be incorporated in the dispersion of the phenol in advance, or a dispersion of the amorphous silica filler in a binder solution is separately prepared and then mixed with the dispersions of the leuco dye and the phenol, and the resulting mixed dispersion is used for formation of the recording layer.

The present invention will now be described in detail with reference to the following examples that by no means limit the scope of the invention.

EXAMPLE 1

In 17.8 l of a 15% solution of lithium chloride heated at 85° C., 3.6 l of a solution of sodium silicate No. 3 (about 7% of $Na_2O$ and about 22% of $SiO_2$) and about 3.6 l of 10% hydrochloric acid were simultaneously poured over a period of 60 minutes so that the pH value of the reaction liquid was maintained at 6 to 8. The formed precipitate was recovered by filtration and washed with 30 l of warm water. The obtained cake was dried in a drier maintained at 130° C. and pulverized by a desk sample mill (Model TAMS-1 supplied by Tokyo Atomizer) to obtain finely divided silica having properties shown in Table 1.

Then, 1 part of the so-obtained finely divided silica was mixed into 2 parts of a liquid (A), 10 parts of a liquid (B) and 6 parts of a liquid (C), each being a heat-sensitive recording layer-forming liquid having a composition shown below and being pulverized and dispersed by a ball mill for 48 hours previously.

| Composition of Liquid (A): | |
|---|---|
| Crystal Violet Lactone | 1 part by weight |
| 5% Hydroxyethyl Cellulose | 5 parts by weight |
| Water | 3 parts by weight |
| Composition of Liquid (B): | |
| Bisphenol A | 1 part by weight |
| 5% Hydroxyethyl Cellulose | 5 parts by weight |
| Water | 3 parts by weight |
| Composition of Liquid (C): | |
| Stearic Acid Amide | 1 part by weight |
| 5% Hydroxyethyl Cellulose | 5 parts by weight |
| Water | 3 parts by weight |

The resulting heat-sensitive recording layer-forming liquid was coated on a commercially available wood-free paper having a basis weight of 64 g/m² so that the weight of the coating on the dry basis was 6 to 7 g/m², and the coating was dried at room temperature.

The so-obtained heat-sensitive recording paper was evaluated with respect to (a) the background coloration density, (b) the density of the colored image formed by heating, (c) the heat-sensitive recording layer-retaining property and (d) the abrasion resistance of the heat-sensitive recording layer according to methods described below. The obtained results are shown in Table 1.

(a) Background Coloration Density:

When 72 hours had passed after the coating operation, the background coloration density of the coated paper having the heat-sensitive recording layer was measured by a standard densitometer (Model FSD-103 supplied by Fuji Photo-Film Co.) using a V-filter, and simultaneously, the naked eye observation was carried out. The evaluation standard is as follows.

| Symbol | Criterion of Evaluation | Background Coloration Density |
|---|---|---|
| | no substantial background coloration was observed | below 0.2 |
| | slight background coloration was observed but paper was practically applicable | 0.2 to 0.3 |
| X | prominent background coloration was observed and paper was not practically applicable | above 0.3 |

(b) Density of Colored Image Formed by Heating:

In order to evaluate the coloring property of the heat-sensitive recording paper, the back surface of the coated paper was pressed for 5 seconds by a thermal plate set at 155° C., and the density of the colored image formed by heating was measured by a standard densitometer (Model FSD-103). Simultaneously, the naked eye observation was carried out. The evaluation standard is as follows.

| Symbol | Criterion of Evaluation | Image Density |
|---|---|---|
| | clear image having high density was obtained | above 1.2 |
| | practical image density was obtained | 1.1 to 1.2 |
| X | image density was low and paper could not practically be used | below 1.1 |

(c) Heat-Sensitive Recording Layer-Retaining Property:

Filter paper No. 2 for the qualitative analysis was placed below the coated paper having the heat-sensitive recording layer and the coated surface of the coated paper was superposed on the filter paper, and a thermal plate set at 155° C. was pressed for 1 minute to the assembly from the back side of the coated surface and the state of the adhesion of the components of the recording layer, which had migrated onto the filter paper, was examined. Furthermore, the adhesion of scum to the thermal head was examined by using a heat-sensitive facscimile device (Model Hifax-3000). The heat-sensitive recording layer-retaining property was generally evaluated according to the following standard.

| Symbol | Criterion of Evaluation |
|---|---|
| | no substantial adhesion was observed |
| | slight adhesion was observed but paper was practically applicable |
| X | considerable adhesion was observed and paper was not practically applicable |

(d) Abrasion Resistance of Heat-Sensitive Recording Layer:

A thermal plate set at 155° C. was pressed for 5 seconds to the back surface of the coated paper having the heat-sensitive recording layer, and the coated paper having a colored image thus obtained was uniformly attached to a sample holding stand of a rotary abrasion machine (supplied by Toyo Seiki Seisakusho) and the sample was rotated under a load of 250 g by using an abrading ring of CS-10. The number of rotations required for abrading the heat-sensitive recording layer until the paper substrate was exposed was measured. Since the wear state was observed at every 5 rotations while stopping the rotation, the rotation number was expressed at intervals of 5 rotations.

| Symbol | Criterion of Evaluation | Rotation Number |
|---|---|---|
| | good abrasion resistance | above 30 |
| | medium abrasion resistance but paper was practically applicable | 20 to 30 |
| X | recording layer was readily abraded and paper was not practically applicable | below 20 |

In the Examples and Comparative Examples, the physical properties of powders were determined according to the following methods.

(1) BET Specific Surface Area (SA):

The specific surface area of each powder was determined according to the so-called BET method utilizing the adsorption of nitrogen gas. This method is described in detail in S. Brunauer, P. H. Emmet and E. Teller, J. Am. Chem. Soc., 60, 309 (1938).

The specific surface area referred to in the instant specification was measured in the following manner. The sample dried to 150° C. was charged in an amount of 0.5 to 0.6 g into a weighing bottle, dried for 1 hour in a thermostat drier maintained at 150° C. and precisely weighed. The sample was charged in an adsorption test tube and heated at 200° C., and evacuation was carried out until the vacuum degree in the adsorption test tube reached $10^{-4}$ mmHg. The test tube was naturally cooled and placed in liquefied nitrogen at about $-196°$ C. At 4 to 5 points in the range of $pN_2/po=0.05$ to 0.30 ($pN_2$ stands for the nitrogen gas pressure and po stands for the atmospheric pressure at the time of the measurement), the amount adsorbed of $N_2$ gas was measured. The amount adsorbed of $N_2$ gas, from which the dead volume was subtracted, was converted to the amount adsorbed at 0° C. under 1 atmosphere and then substituted into the BET equation to determine Vm (cc/g) (which stands for the amount adsorbed of nitrogen gas necessary for forming a monomolecular layer on the surface of the sample). The specific surface area SA (m$^2$/g) was calculated by the formula of $SA=4.35\times Vm$.

(2) Bulk Density (Apparent Specific Gravity):

The bulk density was measured by the iron cylinder method described in the rubber additive test of JIS K-6220. The amount of the sample used for the test was 1 g.

(3) Oil Absorption:

The oil absorption was measured by the pigment test method of JIS K-5101. The amount of the sample used for the test was 0.5 g.

(4) Secondary Particle Size and Particle Size Distribution:

The determination was carried out by using Micron-Photo-Sizer SKN-1000 (supplied by Seishin Kigyo) in which the principle of the centrifugal precipitation method was adopted. The sample was dispersed for 5 minutes by using an ultrasonic dispersing machine (SK-DISPERSER supplied by Seishin Kigyo). From the obtained particle size distribution, the cumulative weight percent of secondary particles having a size smaller than 4 microns and the median size of the secondary particles (50% cumulation point) were determined.

(5) Primary Particle Size:

A photo taken at 5000 to 20000 magnifications by an electron microscope (Model JEM-T6S supplied by Nippon Denshi) was enlarged at a ratio of 50000 to 200000, and the sizes of more than 1000 particles in a certain direction were measured and the arithmetic mean size was calculated.

(6) X-Ray Diffraction:

The X-ray diffraction was conducted by using an X-ray diffraction apparatus (Geigerflex Model 2028 supplied by Rigaku Denki) under the following conditions.
Target: Cu
Filter: Ni
Voltage: 35 KV
Current: 15 mA
Count full scale: 8,000 c/s
Time constant: 1 sec
Scanning speed: 2°/min
Chart speed: 2 cm/min
Diffraction angle: 1°
Slit width: 0.3 mm

EXAMPLE 2

In 18.6 l of a 15% solution of strontium chloride heated at 85° C., 3.2 l of a solution of sodium silicate No. 3 (about 7% of $Na_2O$ and about 22% of $SiO_2$) and about 3.2 l of 14% sulfuric acid were simultaneously poured over a period of 120 minutes so that the pH value of the reaction liquid was maintained at 6 to 8.

The formed precipitate was recovered by filtration and washed with 30 l of warm water. The obtained cake was dried in a drier maintained at 130° C. and pulverized by a desk sample mill (Model TAMS-1 supplied by Tokyo Atomizer) to obtain finely divided silica having physical properties shown in Table 1.

In the same manner as described in Example 1, a heat-sensitive recording paper was prepared by using the so-obtained finely divided silica. The background coloration density, the density of the colored image formed by heating, the heat-sensitive recording layer-retaining property and the abrasion resistance of the heat-sensitive recording layer were measured and evaluated in the same manner as described in Example 1.

The obtained results are shown in Table 1.

EXAMPLE 3

In a mixture of 9 l of a 10% solution of sodium chloride and 9 l of a 10% solution of sodium sulfate, which was heated at 85° C., 3.6 l of a solution of sodium silicate No. 3 (about 7% of $Na_2O$ and about 22% of $SiO_2$) and about 3.6 l of 14% sulfuric acid were simultaneously poured over a period of 60 minutes so that the pH value of the reaction liquid was maintained at 6 to 8.

The formed precipitate was recovered by filtration and washed with 30 l of warm water. The obtained cake was dried in a drier maintained at 130° C. and pulverized by a desk sample mill (Model TAMS-1 supplied by Tokyo Atomizer) to obtain finely divided silica having properties shown in Table 1.

In the same manner as described in Example 1, a heat-sensitive recording paper was prepared by using the so-obtained finely divided silica. The background coloration density, the density of the colored image formed by heating, the heat-sensitive recording layer-retaining property and the abrasion resistance of the heat-sensitive recording layer were measured and evaluated in the same manner as described in Example 1.

The obtained results are shown in Table 1.

EXAMPLE 4

In a mixture of 9 l of a 10% solution of lithium chloride and 9 l of a 10% solution of sodium sulfate, which was heated at 85° C., 3.6 l of a solution of sodium silicate No. 3 (about 7% of $Na_2O$ and about 22% of $SiO_2$) and about 3.6 l of 10% hydrochloric acid were simultaneously poured over a period of 120 minutes so that the pH value of the reaction liquid was maintained at 6 to 8.

The formed precipitate was recovered by filtration and washed with 30 l of warm water. The obtained cake was dried in a drier maintained at 130° C. and pulverized by a desk sample mill (Model TAMS-1 supplied by Tokyo Atomizer) to obtain finely divided silica having properties shown in Table 1.

In the same manner as described in Example 1, a heat-sensitive recording paper was prepared by using the so-obtained finely divided silica. The background coloration density, the density of the colored image formed by heating, the heat-sensitive recording layer-retaining property and the abrasion resistance of the heat-sensitive recording layer were measured and evaluated in the same manner as described in Example 1.

The obtained results are shown in Table 1.

EXAMPLE 5

In 18.6 l of a 7% solution of strontium chloride heated at 85° C., 3.2 l of sodium silicate No. 3 (about 7% of $Na_2O$ and about 22% of $SiO_2$) and about 3.2 l of 10% hydrochloric acid were simultaneously poured over a period of 60 minutes so that the pH value of the reaction liquid was maintained at 6 to 8.

The formed precipitate was recovered by filtration and washed with 30 l of warm water. The obtained cake was dried in a drier maintained at 130° C. and pulverized by a desk sample mill (Model TAMS-1 supplied by Tokyo Atomizer) to obtain finely divided silica having properties shown in Table 1.

In the same manner as described in Example 1, a heat-sensitive recording paper was prepared by using the so-obtained finely divided silica. The background coloration density, the density of the colored image formed by heating, the heat-sensitive recording layer-retaining property and the abrasion resistance of the heat-sensitive recording layer were measured and evaluated in the same manner as described in Example 1.

The obtained results are shown in Table 1.

COMPARATIVE EXAMPLE 1

In 17.8 l of hot water heated at 85° C., 3.6 l of a solution of sodium silicate No. 3 (about 7% of $Na_2O$ and about 22% of $SiO_2$) and about 3.6 l of 14% sulfuric acid were simultaneously poured over a period of 120 minutes so that the pH value of the reaction liquid was maintained at 6 to 8.

The formed precipitate was recovered by filtration and washed with 30 l of warm water. The obtained cake was dried in a drier maintained at 130° C. and pulverized by a desk sample mill (Model TAMS-1 supplied by Tokyo Atomizer) to obtain finely divided silica having properties shown in Table 1.

In the same manner as described in Example 1, a heat-sensitive recording paper was prepared by using the so-obtained finely divided silica. The background coloration density, the density of the colored image formed by heating, the heat-sensitive recording layer-retaining property and the abrasion resistance of the heat-sensitive recording layer were measured and evaluated in the same manner as described in Example 1.

The obtained results are shown in Table 1.

COMPARATIVE EXAMPLE 2

In 20 Kg of a solution of sodium silicate No. 3 (about 1.6% of $Na_2O$ and about 5% of $SiO_2$) was dissolved 1.2 Kg of sodium chloride, and the solution was heated at 85° C. To the heated solution of sodium silicate No. 3 containing sodium chloride was dropped about 5 l of 7.5% hydrochloric acid over a period of 60 minutes so that the pH value of the reaction mixture at the time of completion of the reaction was about 5.

The formed precipitate was recovered by filtration and washed with 30 l of warm water. The obtained cake was dried in a drier maintained at 130° C. and pulverized by a desk sample mill (Model TAMS-1 supplied by Tokyo Atomizer) to obtain finely divided silica having properties shown in Table 1.

In the same manner as described in Example 1, a heat-sensitive recording paper was prepared by using the so-obtained finely divided silica. The background coloration density, the density of the colored image formed by heating, the heat-sensitive recording layer-retaining property and the abrasion resistance of the heat-sensitive recording layer were measured and evaluated in the same manner as described in Example 1.

The obtained results are shown in Table 1.

COMPARATIVE EXAMPLES 3 THROUGH 6

Properties of Celite 219 (powdered diatomaceous earth supplied by Johns Manville Co.) (Comparative Example 3), Syloid 244 (finely divided silica supplied by Fuji-Devison Kagaku) (Comparative Example 4), Mizukasil (finely divided silica supplied by Mizusawa Kagaku) (Comparative Example 5) and Ultrasil VN3 (white carbon supplied by Degussa Co.) (Comparative Example 6) are shown in Table 1.

Heat-sensitive recording papers were prepared by using these powders in the same manner as described in Example 1. With respect to each of the recording papers, the background coloration density, the density of the colored image formed by heating, the heat-sensitive recording layer-retaining property and the abrasion resistance of the heat-sensitive recording layer were measured and evaluated in the same manner as described in Example 1.

The obtained results are shown in Table 1.

TABLE 1

| | Properties of Powder | | | | | |
|---|---|---|---|---|---|---|
| | Specific Surface Area ($m^2/g$) | Bulk Density ($g/cm^3$) | Oil Absorption (ml/100 g) | Cumulative Weight % of Particles Having Size Smaller Than $4\mu$ | Median Size ($\mu$) of Secondary (50% Cumulation Diameter) | Mean Size ($m\mu$) of Primary Particles (Number Average Size in Constant Direction) |
| Example 1 | 41 | 0.198 | 145 | 97.3 | 0.6 | 65 |
| Example 2 | 57 | 0.175 | 162 | 99.2 | 0.5 | 51 |
| Example 3 | 32 | 0.232 | 137 | 93.3 | 0.8 | 92 |
| Example 4 | 15 | 0.297 | 104 | 92.9 | 0.9 | 120 |
| Example 5 | 95 | 0.146 | 195 | 91.5 | 1.0 | 33 |
| Comparative Example 1 | 158 | 0.125 | 221 | 89.2 | 1.8 | 19 |
| Comparative Example 2 | 17 | 0.424 | 66 | 60.9 | 3.7 | 121 |
| Comparative Example 3 | 4 | 0.229 | 92 | 30.5 | 5.1 | — |
| Comparative Example 4 | 312 | 0.139 | 249 | 93.0 | 1.2 | measurement impossible (about 10 $m\mu$) |

TABLE 1-continued

| | Properties of Powder | | | | | |
|---|---|---|---|---|---|---|
| Comparative Example 5 | 385 | 0.225 | 168 | 84.1 | 1.9 | measurement impossible (below 10 mμ) |
| Comparative Example 6 | 209 | 0.277 | 137 | 9.3 | 10.1 | 15 |

| | Background Coloration Density | | Density of Colored Image Formed by Heating | | Heat-Sensitive Recording Layer-Retaining | Abrasion Resistance of Heat-Sensitive Recording Layer | |
|---|---|---|---|---|---|---|---|
| | Evaluation | Density | Evaluation | Density | Property Evaluation | Evaluation | Rotation Number |
| Example 1 | | 0.14 | | 1.34 | | | 35 |
| Example 2 | | 0.15 | | 1.35 | | | 40 |
| Example 3 | | 0.15 | | 1.32 | | | 35 |
| Example 4 | | 0.14 | | 1.27 | | | 40 |
| Example 5 | | 0.15 | | 1.27 | | | 35 |
| Comparative Example 1 | | 0.21 | | 1.18 | | | 20 |
| Comparative Example 2 | | 0.14 | X | 1.05 | X | | 40 |
| Comparative Example 3 | | 0.15 | X | 1.03 | X | | 40 |
| Comparative Example 4 | X | 0.53 | | 1.19 | | X | 15 |
| Comparative Example 5 | X | 0.66 | | 1.18 | | | 25 |
| Comparative Example 6 | | 0.22 | X | 1.00 | X | X | 15 |

EXAMPLE 6

To 1 part of finely divided silica obtained in Example 1 was added 5 parts of pure water, and the mixture was charged in a glass bottle having a capacity of 200 ml and dispersed for 15 minutes in a paint shaker (supplied by Red Devil Co.). Then 5 parts of the dispersion was incorporated and mixed in 1 part of a liquid (A), 5 parts of a liquid (B) and 3 parts of a liquid (C), each being a heat-sensitive recording layer-forming liquid having a composition shown below and being pulverized and dispersed by a ball mill for 48 hours previously.

| Composition of Liquid (A): | |
|---|---|
| Crystal Violet Lactone | 1 part by weight |
| 5% Aqueous Solution of PVA | 5 parts by weight |
| Composition of Liquid (B): | |
| Bisphenol A | 1 part by weight |
| 5% Aqueous Solution of PVA | 5 parts by weight |
| Composition of Liquid (C): | |
| Stearic Acid Amide | 1 part by weight |
| 5% Aqueous Solution of PVA | 5 parts by weight |

The so-obtained heat-sensitive recording layer-forming liquid was coated on a commercially available wood-free paper having a basis weight of 64 g/m² so that the amount of the coating was 6 to 7 g/m² on the dry base, and the coating was dried at room temperature.

With respect to the so-obtained heat-sensitive recording paper, the background coloration density, the density of the colored image formed by heating and the heat-sensitive recording layer-retaining property were measured and evaluated in the same manner as described in Example 1.

The obtained results are shown in Table 2.

REFERENTIAL EXAMPLE 1

In 9 liters of water was dissolved 933 g of urea (extra pure reagent), and 467 g of a 37% aqueous solution of formaldehyde (extra pure reagent) was added to the solution. The pH value was adjusted to 3.3 by using hydrochloric acid, and the solution was transferred into a reaction vessel equipped with a refluxing device and reaction was carried out at 98° C. for 2 hours. At the time of completion of the reaction, the pH value was 5.6.

The formed precipitate was recovered by filtration and washed with 30 liters of warm water. The obtained cake was dried in a drier maintained at 130° C. and roughly pulverized by a desk sample mill (Model TAMS-1 supplied by Tokyo Atomizer). Then, water was added to the pulverized resin so that the concentration of the resin was 20%. The mixture was pulverized for 2 hours in a ball mill, and water was separated by filtration and the residue was dried in a drier maintained at 130° C. and pulverized two times by a desk sample mill (Model TAMS-1 supplied by Tokyo Atomizer) to obtain a finely divided urea-formaldehyde resin having properties shown in Table 2. The X-ray diffraction pattern of the finely divided urea-formaldehyde resin is shown in FIG. 1.

In the same manner as described in Example 6, a heat sensitive recording paper was prepared by using the so-obtained finely divided urea-formaldehyde resin.

The background coloration density, the density of the colored image formed by heating and the heat-sensitive recording layer-retaining property were measured and evaluated in the same manner as described in Example 1.

The obtained results are shown in Table 2.

EXAMPLE 7

In a ball mill were charged 222 g of the undried urea-formaldehyde resin filtration cake obtained in Referential Example 1 and 778 ml of pure water, and pulverization was conducted for 6 hours. The pulverized resin was mixed with 690 g of the undried finely divided silica filtration cake obtained according to the method of Example 1 for 5 minutes by a blender (Waring Commercial Blender Model HGB-100). Water was separated by filtration, and the obtained cake was dried in a drier maintained at 130° C. and pulverized by a desk sample mill (Model TAMS-1 supplied by Tokyo Atomizer) to obtain a finely divided composite filler having properties shown in Table 2.

The background coloration density, the density of the colored image formed by heating and the heat-sensitive recording layer-retaining property were measured and evaluated in the same manner as described in Example 1.

The obtained results are shown in Table 2.

EXAMPLE 8

The finely divided urea-formaldehyde resin obtained in Referential Example 1 and the finely divided silica obtained in Example 1 were mixed together for 5 minutes by using a Super Mixer (supplied by Kawada Seisakusho) at a ratio shown below.

| Example No. | Parts of Finely Divided Urea-Formaldehyde Resin | Parts of Finely Divided Silica |
| --- | --- | --- |
| 8-(1) | 90 | 10 |
| 8-(2) | 80 | 20 |
| 8-(3) | 60 | 40 |
| 8-(4) | 50 | 50 |
| 8-(5) | 40 | 60 |
| 8-(6) | 20 | 80 |
| 8-(7) | 10 | 90 |

In the same manner as described in Example 6, a heat-sensitive recording paper was prepared by using the so-obtained finely divided composite filler.

The background coloration density, the density of the colored image formed by heating and the heat-sensitive recording layer-retaining property were measured and evaluated in the same manner as described in Example 1.

The obtained results are shown in Table 2. The relation between the mixing ratio of the finely divided urea-formaldehyde resin to the finely divided silica and the background coloration density is shown in FIG. 2 and the relation between this mixing ratio and the density of the colored image formed by heating is shown in FIG. 3.

TABLE 2

| | Properties of Powder | | | | |
| --- | --- | --- | --- | --- | --- |
| | Specific Surface Area ($m^2/g$) | Bulk Density ($g/cm^3$) | Oil Absorption (ml/100 g) | Cumulative Weight % of Particles Having Size Smaller Than $4\mu$ | Median Size ($\mu$) of Secondary Particles (50% Cumulation Size) |
| Referential Example 1 | 4 | 0.415 | 57 | 71.9 | 2.8 |
| Example 6 | 41 | 0.198 | 145 | 97.3 | 0.6 |
| Example 7 | 29 | 0.252 | 85 | 84.2 | 2.0 |
| Example 8-(1) | 8 | 0.388 | 64 | 75.3 | 2.4 |
| Example 8-(2) | 13 | 0.375 | 72 | 79.2 | 2.1 |
| Example 8-(3) | 20 | 0.330 | 85 | 84.0 | 1.8 |
| Example 8-(4) | 24 | 0.303 | 91 | 87.7 | 1.6 |
| Example 8-(5) | 27 | 0.275 | 106 | 90.4 | 1.3 |
| Example 8-(6) | 35 | 0.232 | 121 | 92.9 | 0.9 |
| Example 8-(7) | 39 | 0.211 | 131 | 95.1 | 0.7 |

| | Properties of Heat Sensitive Recording Paper | | |
| --- | --- | --- | --- |
| | Background Coloration Density | Density of Colored Image Formed by Heating | Heat-Sensitive Recording Layer-Retaining Property Evaluation |
| Referential Example 1 | 0.13 | 1.28 | |
| Example 6 | 0.22 | 1.39 | |
| Example 7 | 0.14 | 1.32 | |
| Example 8-(1) | 0.13 | 1.31 | |
| Example 8-(2) | 0.14 | 1.35 | |
| Example 8-(3) | 0.14 | 1.37 | |
| Example 8-(4) | 0.15 | 1.37 | |
| Example 8-(5) | 0.16 | 1.38 | |
| Example 8-(6) | 0.19 | 1.38 | |
| Example 8-(7) | 0.21 | 1.39 | |

From the results of the foregoing examples, it will readily be understood that if finely divided silica is used for a heat-sensitive recording paper according to the present invention, the background coloration is reduced, the density of the colored image formed by heating is high and the sticking of the paper or the adhesion of scum to the thermal head or the like is effectively prevented, and that an excellent heat-sensitive recording paper is provided according to the present invention.

We claim:

1. A heat-sensitive recording paper comprising a paper substrate and a heat-sensitive recording layer formed on the paper substrate, which comprises a composition formed by dispersing in a binder a coloring agent composed of a leuco dye, a color developer composed of a heat-fusible phenol and an inorganic filler, wherein the inorganic filler comprises finely divided amorphous silica having a BET specific surface area of 10 to 100 $m^2/g$ and a bulk density of 0.14 to 0.30 g/cc, said finely divided amorphous silica having such a secondary particle size distribution that secondary particles having a size smaller than 4 microns, as measured by the centrifugal precipitation method, occupy at least 90% by weight of the total particles.

2. A heat-sensitive recording paper as set forth in claim 1, wherein the amorphous silica is contained in said composition in an amount of 10 to 60% by weight based on the solids.

* * * * *